Aug. 21, 1923.
A. S. WOOLSTENCROFT
FLOUR SIFTER
Filed July 22, 1922
1,465,325
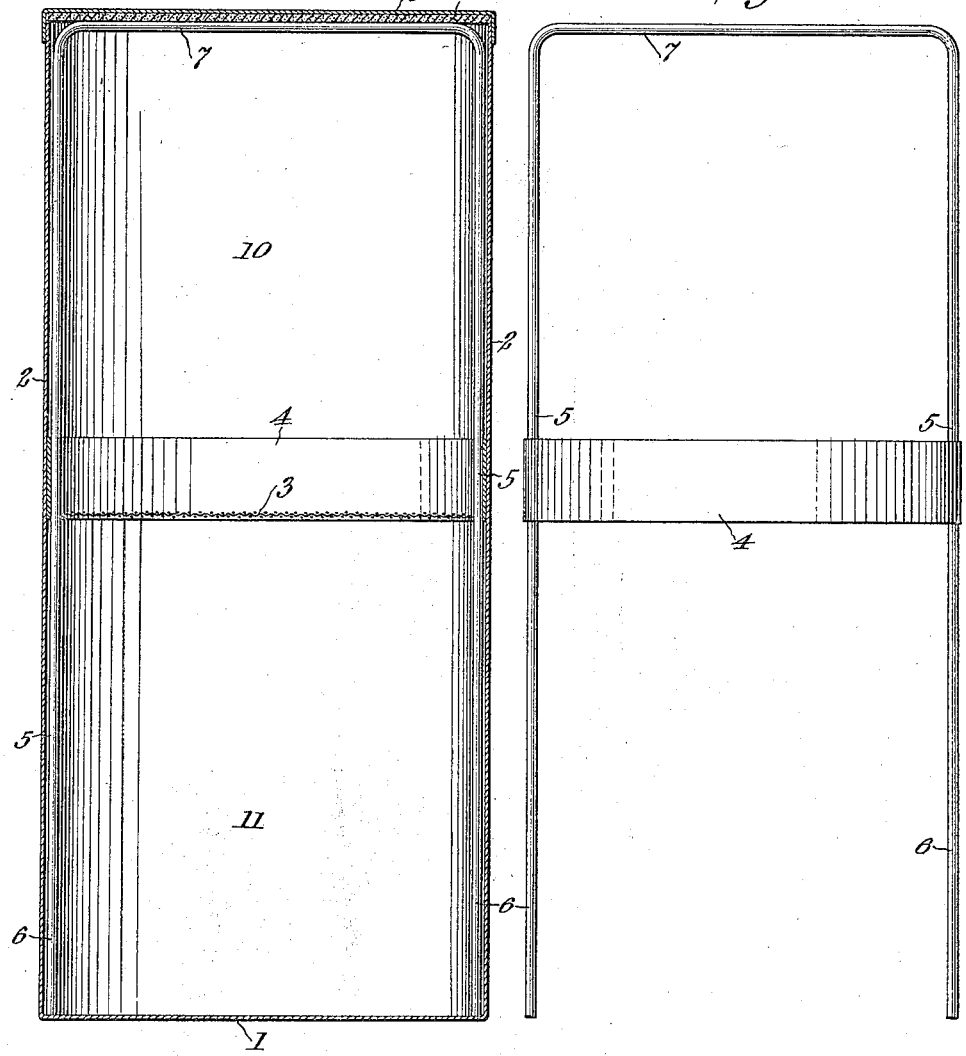
Inventor:
Alexander S. Woolstencroft
by Wm. H. Tincuel
Attorney Patented Aug. 21, 1923.

1,465,325

UNITED STATES PATENT OFFICE.

ALEXANDER S. WOOLSTENCROFT, OF FULDA, MINNESOTA.

FLOUR SIFTER.

Application filed July 22, 1922. Serial No. 576,776.

*To all whom it may concern:*

Be it known that I, ALEXANDER S. WOOLSTENCROFT, a citizen of the United States, residing at Fulda, in the county of Murray and State of Minnesota, have invented a certain new and useful Improvement in Flour Sifters, of which the following is a full, clear, and exact description.

The object of this invention is to provide a sifter for flour and the like adapted, primarily, to the purpose of sifting flour several times before its removal from the sifter, but it is well adapted, also, for use, as flour sifters are ordinarily employed, for sifting flour only once before it is made into a dough or batter or otherwise used.

The invention consists in a flour sifter comprising a receptacle having a bottom, side walls, and an open top, a cover for closing the top of the receptacle, and a removable sifter-screen provided with a support contacting with the bottom and the cover of the receptacle to hold the screen in proper position substantially midway of the height of the receptacle, as I will proceed now to explain and finally claim.

In the accompanying drawings illustrating the invention, in the several figures of which like parts are similarly designated, Figure 1 is a central vertical section of the sifter. Fig. 2 is an elevation of the sifter-screen and ring with its support, removed from the receptacle.

The sifter comprises a receptacle such as a cylindrical, or other shaped, can having a bottom 1 and side walls 2 and open at its top.

3 is a sifter-screen, carried by a ring 4 of such dimensions as to provide for itself a sliding frictional engagement with the side walls 2 of the receptacle. The screen 3 may be connected to the ring 4 in any suitable way, as by soldering or by rolling the edge of the screen and ring together. It is desirable for best practical operation of the sifter to support the screen 3 substantially midway of the receptacle, and this I accomplish by means of a support in the form of a substantially inverted U-shaped wire, the sides 5 of which are connected to the ring 4 by soldering or in any other suitable manner. The portions of these sides extending below the screen form legs 6 adapted to contact with the bottom 1 of the receptacle. The portion of the support which extends above the screen forms a handle 7 adapted to contact with a close-fitting cover 8. The screen and its support are adapted to be wholly contained within the receptacle and to be bodily removable therefrom.

If desired, the cover 8 may be provided with a pad 9 of blotting paper or the like, for the purpose of sealing the receptacle against the escape of flour during the sifting operation.

Referring particularly to Fig. 1, my sifter is used as follows:—The cover 8 is removed and the required amount of flour is placed in the chamber 10 of the receptacle above the screen 3, and the cover replaced. Then the sifter is grasped in the two hands of the user by its top and bottom and shaken until, as the balance of the sifter indicates, all of the flour has passed through the screen and into the lower chamber 11. Now, if desired, the cover may be removed and any large particles of flour, or any extraneous matter, which failed to pass through the screen may be removed by lifting the screen out of the receptacle by its handle 7, and the particles of flour and extraneous matter being retained upon the screen by the ring 4, may be dumped out.

If one sifting of the flour is deemed sufficient, the sifted flour may now be removed from the receptacle.

If two siftings are desired, the screen may be replaced, the receptacle inverted, and the sifted flour resifted and at the same time discharged through the top of the receptacle. When the receptacle is used in inverted position the frictional engagement of ring 4 with the side walls 2 of the receptacle will ordinarily be sufficient to hold the screen in position, but if the frictional engagement is not sufficient to so hold the screen, the user may place a finger over the top edge of the receptacle and upon the handle 7.

If it is desired to sift the flour a number of times after the large particles and extraneous matter have been removed, it is merely necessary to replace the screen and cover and by repeatedly inverting and shaking the receptacle sift the flour back and forth through the screen until it is thought to be in the condition desired for use.

By making a frictional or close fit between the ring 4 and the side walls 2, it is obvious that I make it necessary for all of the flour placed in the receptacle to pass through the screen instead of leaking around it.

It is to be noted that when the screen is mounted in the receptacle and the cover is on, the contact of the legs 6 with the bottom and of the handle 7 with the cover maintains the screen in fixed relation substantially midway of the receptacle.

It will thus be seen that I provide a sifter of the kind desired which is of simple, cheap and durable construction, easily operated, and thoroughly efficient for the purposes for which it is designed.

I am aware that sifters for sifting flour and the like a number of times have been devised, but I do not know of any in which the screen is removably mounted in a container and provided with a handle for lifting it out of the container and legs for supporting it in proper position within the container.

I have hereinabove spoken of the sifter as a flour sifter, and it is for the sifting of flour that it is primarily adapted; but it is obvious that it is capable of use for sifting other materials as well as flour.

It is conceivable that various changes and modifications may be made in the invention as shown and described, and I therefore wish it understood that I do not consider the same as limited to the particular disclosure, except as set forth in the following claims.

What I claim is:—

1. A flour sifter, comprising a receptacle having a closed bottom and an open top, a cover for closing the receptacle, a screen, and a support for said screen coextensive with the height of said receptacle and cooperating with the bottom and cover of the receptacle to maintain the screen in adjusted relation within the receptacle.

2. A flour sifter, comprising a receptacle having a closed bottom and an open top, a cover for closing the receptacle, a screen, and a support for said screen extending above and below it and coextensive with the height of the receptacle, the lower portion of the support contacting with the bottom of the receptacle and the upper portion thereof contacting with the cover, the screen and its support being bodily removable from the receptacle.

3. A flour sifter, comprising a receptacle having a closed bottom and an open top, a cover for closing the top opening, a screen, and a support for said screen extending above and below it and coextensive with the height of the receptacle, the lower portion of the support forming legs contacting with the bottom of the receptacle, and the upper portion thereof forming a handle and contacting with said cover, whereby the screen is supported substantially midway of the height of said receptacle.

4. A flour sifter, comprising a receptacle having an open top, a cover for said top, a screen, and means coextensive with the height of the receptacle for supporting said screen substantially midway of the height of said receptacle, said means including a handle adapted to contact with said cover.

5. A flour sifter, comprising a receptacle having a bottom, side walls and an open top, a cover for said top, a screen-carrying ring arranged for frictional engagement with said side walls, and a support for said ring coextensive with the height of said receptacle and contacting with said bottom and cover and adapted to position said ring within said receptacle.

6. A flour sifter, comprising a receptacle having a closed bottom, side walls and an open top, a cover for said top, a screen, a ring carrying said screen, and a support for said ring coextensive with the height of said receptacle and comprising legs and a handle, said legs contacting with the bottom of said receptacle and said handle contacting with said cover, whereby said ring is held in fixed relation within the receptacle when the cover is in place thereon, and the handle affording means whereby the screen may be removed from the receptacle when the cover is removed.

In testimony whereof I have hereunto set my hand this 21st day of July A. D. 1922.

ALEXANDER S. WOOLSTENCROFT.

Witnesses:
F. G. Seeler,
P. J. Hess.